United States Patent
Gormley

(10) Patent No.: US 10,309,343 B2
(45) Date of Patent: Jun. 4, 2019

(54) SPLIT SLEEVE HIDDEN DOOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 651 days.

(21) Appl. No.: 14/534,988

(22) Filed: Nov. 6, 2014

(65) Prior Publication Data

US 2016/0160799 A1   Jun. 9, 2016

(51) Int. Cl.
| | |
|---|---|
| F02K 1/70 | (2006.01) |
| F02K 1/72 | (2006.01) |
| F02K 1/76 | (2006.01) |
| F02K 1/08 | (2006.01) |
| F02K 1/06 | (2006.01) |
| F02K 1/30 | (2006.01) |

(52) U.S. Cl.
CPC ............. *F02K 1/763* (2013.01); *F02K 1/70* (2013.01); *F02K 1/72* (2013.01); *F02K 1/766* (2013.01); *F02K 1/06* (2013.01); *F02K 1/08* (2013.01); *F02K 1/30* (2013.01); *F02K 1/76* (2013.01); *F05D 2220/36* (2013.01); *F05D 2260/50* (2013.01); *F05D 2260/56* (2013.01); *F05D 2260/57* (2013.01)

(58) Field of Classification Search
CPC ..... F02K 1/06; F02K 1/30; F02K 1/32; F02K 1/70; F02K 1/72; F02K 1/76; F02K 1/763; F02K 1/766
See application file for complete search history.

(56) References Cited

U.S. PATENT DOCUMENTS

| | | | | |
|---|---|---|---|---|
| 2,950,595 A | * | 8/1960 | Laucher | F02K 1/625 239/265.31 |
| 3,036,431 A | * | 5/1962 | Vdolek | F02K 1/625 239/265.31 |
| 3,059,426 A | * | 10/1962 | Laucher | F02K 1/625 239/265.31 |
| 3,262,268 A | * | 7/1966 | Beavers | F02K 1/72 239/265.19 |
| 3,347,467 A | * | 10/1967 | Carl | F02K 1/04 239/265.13 |
| 3,621,763 A | | 11/1971 | Geyer | |
| 3,703,258 A | * | 11/1972 | Wildner | F02K 1/12 239/265.29 |

(Continued)

FOREIGN PATENT DOCUMENTS

| | | |
|---|---|---|
| EP | 0801221 | 10/1997 |
| WO | WO2012010774 A2 | 1/2012 |

OTHER PUBLICATIONS

EP search report for EP15193422.1 dated Apr. 4, 2016.

*Primary Examiner* — Todd E Manahan
*Assistant Examiner* — Eric Linderman
(74) *Attorney, Agent, or Firm* — O'Shea Getz P.C.

(57) ABSTRACT

A system for a thrust reverser of an aircraft includes a primary sleeve and a secondary sleeve having cascades. The secondary sleeve is coupled to a set of blocker doors. The sliding motions of the primary sleeve and the secondary sleeve are not directly coupled when each moves between its stowed and deployed positions. The sliding motion of the primary sleeve may begin at a different time and continue at a different rate from the sliding motion of the secondary sleeve.

18 Claims, 9 Drawing Sheets

(56) References Cited

U.S. PATENT DOCUMENTS

| | | | | |
|---|---|---|---|---|
| 3,779,010 A | * | 12/1973 | Chamay | F02K 1/09 239/265.31 |
| 3,814,324 A | * | 6/1974 | Wanger | F02K 1/12 239/127.3 |
| 3,815,357 A | * | 6/1974 | Brennan | F02K 1/70 244/76 B |
| 3,829,020 A | * | 8/1974 | Stearns | F02K 1/09 181/216 |
| 3,831,376 A | * | 8/1974 | Moorehead | F02K 1/70 239/265.29 |
| 3,981,451 A | * | 9/1976 | Prior | F02K 1/72 239/265.31 |
| 4,005,822 A | * | 2/1977 | Timms | B64C 25/423 239/265.31 |
| 4,145,877 A | * | 3/1979 | Montgomery | F02K 1/72 60/226.2 |
| 4,185,798 A | * | 1/1980 | Dickenson | F02K 1/605 239/265.29 |
| 4,278,220 A | * | 7/1981 | Johnston | F02K 1/72 244/110 B |
| 4,340,178 A | * | 7/1982 | Lawson | F02K 1/605 239/265.31 |
| 4,373,328 A | * | 2/1983 | Jones | F02K 1/72 239/265.27 |
| 4,564,160 A | * | 1/1986 | Vermilye | F02K 1/72 239/265.29 |
| 4,716,724 A | * | 1/1988 | Newton | F02K 1/72 239/265.29 |
| 4,731,991 A | * | 3/1988 | Newton | F02K 1/72 239/265.31 |
| 4,807,434 A | * | 2/1989 | Jurich | F02K 1/72 239/265.29 |
| 4,823,547 A | * | 4/1989 | Newton | F02K 1/72 239/265.31 |
| 4,894,985 A | * | 1/1990 | Dubois | F02K 1/70 239/265.29 |
| 4,922,713 A | * | 5/1990 | Barbarin | F02K 1/72 239/265.31 |
| 4,930,307 A | * | 6/1990 | Newton | B64C 7/02 239/265.31 |
| 5,228,641 A | * | 7/1993 | Remlaoui | F02K 1/72 239/265.31 |
| 5,309,711 A | * | 5/1994 | Matthias | F02K 1/72 239/265.29 |
| 5,655,360 A | * | 8/1997 | Butler | F02K 1/72 239/265.29 |
| 5,778,659 A | * | 7/1998 | Duesler | F02K 1/09 239/265.27 |
| 5,806,302 A | * | 9/1998 | Cariola | F02K 1/09 239/265.29 |
| 5,819,528 A | * | 10/1998 | Masson | F02K 1/70 239/265.33 |
| 5,987,880 A | * | 11/1999 | Culbertson | F02K 1/70 239/265.37 |
| 6,036,238 A | | 3/2000 | Lallament | |
| 6,065,285 A | * | 5/2000 | Gonidec | F02K 1/70 239/265.29 |
| 6,079,201 A | * | 6/2000 | Jean | F02K 1/70 239/265.29 |
| 6,082,096 A | * | 7/2000 | Vauchel | F02K 1/70 239/265.29 |
| 6,151,886 A | * | 11/2000 | Vauchel | F02K 1/70 60/226.2 |
| 6,158,211 A | * | 12/2000 | Gonidec | F02K 1/70 60/226.2 |
| 6,170,254 B1 | | 1/2001 | Cariola | |
| 6,256,980 B1 | * | 7/2001 | Lecordix | F02K 1/72 239/265.29 |
| 6,340,135 B1 | * | 1/2002 | Barton | B64D 29/00 244/53 B |
| 6,434,927 B1 | * | 8/2002 | Stretton | F02K 1/72 239/265.31 |
| 6,786,315 B1 | * | 9/2004 | Christensen | F02K 1/763 188/181 T |
| 6,845,946 B2 | | 1/2005 | Lair | |
| 6,895,742 B2 | | 5/2005 | Lair | |
| 7,127,880 B2 | * | 10/2006 | Lair | F02K 1/72 239/265.25 |
| 7,146,796 B2 | * | 12/2006 | Lair | E05B 47/0607 239/265.25 |
| 7,264,203 B2 | | 9/2007 | Lair | |
| 7,484,356 B1 | * | 2/2009 | Lair | F02K 1/72 60/226.2 |
| 7,513,101 B2 | | 4/2009 | Eschborn | |
| 7,600,371 B2 | * | 10/2009 | Sternberger | F02K 1/62 239/265.31 |
| 8,109,467 B2 | * | 2/2012 | Murphy | F02K 1/72 244/110 B |
| 8,127,532 B2 | * | 3/2012 | Howe | F02K 1/1207 60/226.3 |
| 8,201,390 B2 | * | 6/2012 | Sternberger | F02K 1/72 239/265.33 |
| 8,578,699 B2 | * | 11/2013 | Kubiak | F02K 1/16 239/265.19 |
| 8,713,911 B2 | * | 5/2014 | Kopecek | F02K 1/72 239/265.19 |
| 8,869,507 B2 | * | 10/2014 | Cloft | F02K 1/68 239/265.27 |
| 8,899,013 B2 | * | 12/2014 | Hurlin | F01D 5/005 244/110 B |
| 8,938,944 B2 | * | 1/2015 | Todorovic | F02C 7/14 184/6.11 |
| 9,068,532 B2 | * | 6/2015 | Gormley | F02K 1/72 |
| 9,074,554 B2 | * | 7/2015 | Caruel | F02K 1/72 |
| 9,109,540 B2 | * | 8/2015 | Vauchel | F01D 11/005 |
| 9,181,898 B2 | * | 11/2015 | Bhatt | F02K 1/72 |
| 9,206,765 B2 | * | 12/2015 | Vauchel | F02K 1/72 |
| 9,212,624 B2 | * | 12/2015 | Aten | F02K 1/72 |
| 9,328,694 B2 | * | 5/2016 | Todorovic | F02K 3/025 |
| 9,410,502 B2 | * | 8/2016 | Vauchel | F02K 3/025 |
| 9,714,612 B2 | * | 7/2017 | Lacko | F02K 1/70 |
| 9,895,840 B2 | * | 2/2018 | Bartel | B29C 70/342 |
| 10,018,151 B2 | * | 7/2018 | Nakhjavani | F02K 1/72 |
| 2002/0144499 A1 | * | 10/2002 | Rouyer | F02K 1/766 60/226.2 |
| 2003/0024236 A1 | * | 2/2003 | Lymons | F02K 1/72 60/226.2 |
| 2004/0068978 A1 | * | 4/2004 | Lair | F02K 1/70 60/226.2 |
| 2004/0195434 A1 | * | 10/2004 | Parham | F02K 1/70 244/11 |
| 2004/0195443 A1 | * | 10/2004 | Lair | F02K 1/70 244/110 B |
| 2005/0039438 A1 | * | 2/2005 | Lair | F02K 1/763 60/226.2 |
| 2005/0151012 A1 | * | 7/2005 | Lair | F02K 1/70 244/110 B |
| 2006/0005530 A1 | * | 1/2006 | Blin | F02K 1/625 60/226.2 |
| 2006/0288688 A1 | * | 12/2006 | Lair | F02K 1/386 60/226.2 |
| 2007/0007388 A1 | * | 1/2007 | Harrison | F02K 1/766 244/110 B |
| 2007/0234707 A1 | * | 10/2007 | Beardsley | F02K 1/72 60/226.2 |
| 2009/0321561 A1 | * | 12/2009 | Andre | F02K 1/72 244/110 B |
| 2010/0024387 A1 | * | 2/2010 | Marche | F02K 1/72 60/226.2 |
| 2010/0132331 A1 | * | 6/2010 | Tsou | F01D 11/003 60/226.2 |
| 2010/0212286 A1 | * | 8/2010 | West | F02K 1/32 60/226.2 |
| 2010/0212287 A1 | * | 8/2010 | Kubiak | F02K 1/763 60/226.2 |
| 2010/0218479 A1 | * | 9/2010 | Moradell-Casellas | F02K 1/72 60/226.2 |
| 2011/0167790 A1 | | 7/2011 | Cloft | |

(56) References Cited

U.S. PATENT DOCUMENTS

| | | | |
|---|---|---|---|
| 2011/0277448 A1* | 11/2011 | Roberts | B64D 29/06 60/226.2 |
| 2012/0079805 A1* | 4/2012 | Stuart | F02K 3/06 60/226.2 |
| 2012/0124963 A1* | 5/2012 | Howe | A63F 13/12 60/204 |
| 2012/0138707 A1* | 6/2012 | Vauchel | F02K 1/72 239/265.29 |
| 2012/0304621 A1* | 12/2012 | Stuart | F01D 25/243 60/226.2 |
| 2013/0025259 A1* | 1/2013 | Beardsley | F02K 1/72 60/226.2 |
| 2013/0160425 A1* | 6/2013 | Scanlon | F01D 17/02 60/226.3 |
| 2013/0186219 A1 | 7/2013 | Jones | |
| 2013/0205753 A1* | 8/2013 | Todorovic | F02K 3/025 60/226.2 |
| 2013/0284822 A1* | 10/2013 | Howarth | F02K 1/70 239/11 |
| 2013/0292490 A1* | 11/2013 | Chapelain | F02K 1/70 239/265.37 |
| 2014/0110503 A1* | 4/2014 | Teulou | B64D 33/04 239/265.19 |
| 2014/0131480 A1* | 5/2014 | Hurlin | F02K 1/72 239/265.19 |
| 2014/0150403 A1* | 6/2014 | Stuart | F02K 1/72 60/204 |
| 2015/0016965 A1* | 1/2015 | Sawyers-Abbott | F02K 1/72 415/148 |
| 2015/0108249 A1* | 4/2015 | James | F02K 1/62 239/265.19 |
| 2015/0176528 A1* | 6/2015 | Peyron | F02K 1/72 239/265.19 |
| 2015/0308379 A1* | 10/2015 | James | F02K 1/763 60/226.2 |
| 2015/0308380 A1* | 10/2015 | Biset | F02K 1/32 60/226.2 |
| 2016/0025037 A1* | 1/2016 | Gomes | F02K 1/72 415/1 |
| 2016/0131078 A1* | 5/2016 | Gormley | F02K 1/70 239/265.33 |
| 2016/0131082 A1* | 5/2016 | Gormley | F02K 1/766 239/265.19 |
| 2016/0153399 A1* | 6/2016 | Sawyers-Abbott | F02K 1/72 239/1 |
| 2016/0169157 A1* | 6/2016 | Sawyers-Abbott | F02K 1/72 239/1 |
| 2016/0230702 A1* | 8/2016 | Charron | F02K 1/72 |
| 2016/0363097 A1* | 12/2016 | Foutch | F02K 1/72 |
| 2016/0369744 A1* | 12/2016 | Gormley | F02K 1/72 |
| 2017/0074211 A1* | 3/2017 | Smith | F02K 1/09 |
| 2017/0107944 A1* | 4/2017 | Kawai | F02K 1/763 |
| 2017/0152811 A1* | 6/2017 | Acheson | F02K 1/72 |
| 2017/0167439 A1* | 6/2017 | Crawford | F02K 1/72 |

\* cited by examiner

SPLIT SLEEVE HIDDEN DOOR THRUST REVERSER

BACKGROUND

Within a turbo fan engine that utilizes a cascade type thrust reverser, there are typically a plurality of blocker doors that deploy in order to redirect engine bypass air thru a set of cascades that turn the airflow out and forward in order to reverse the direction of the thrust of the engine. This may be done to slow an aircraft after landing. Referring to FIG. 1A, a system 100 is shown. The system 100 includes a sleeve 102 that is translated or moved in, e.g., an aft direction in order to expose cascades 104 as part of the deployment of the thrust reverser. Similarly, in order to place the thrust reverser in a stowed state (e.g., during flight) the sleeve 102 is translated or moved in, e.g., a forward (FWD) direction, such that the sleeve 102 may contact or abut a thrust reverser fixed structure 106. When in the stowed state, the cascades 104 are not exposed. FIG. 3 illustrates the system 100 in the stowed state. An entirety of a nacelle is shown in FIG. 3, whereas a portion (e.g., a half) of the nacelle is shown in FIG. 1A.

The blocker doors described above are typically pivotally attached to the sleeve 102 within the thrust reverser. FIG. 1B illustrates a blocker door 108 of the system 100 hinged to the sleeve 102 near a point 110. Additionally, the door 108 is attached to the inner fixed structure 114 of the thrust reverser via a drag link 112 that retains the door 108 in position during normal flight as well as aids in the deployment of the door 108 during thrust reverse mode. During flight, the door 108 forms, in part, the outer surface of a bypass duct. The drag link 112 crosses this bypass duct in attaching to the inner fixed structure.

The drag link 112 lies within the engine airflow and generates drag losses on the engine, resulting in degraded efficiencies. Any steps and gaps around the blocker door 108 generate aerodynamic disturbances that reduce overall efficiency.

Moreover, in conventional thrust reverser systems the actuation mechanism used to drive the sleeve 102 is the same mechanism that is used to drive the blocker door 108. Accordingly, the sleeve 102 and blocker door 108 are operated at the same speed and over commonly-defined distances (also referred to as strokes).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a thrust reverser of an aircraft comprising: a primary sleeve, and a secondary sleeve coupled to a blocker door, wherein a stroke associated with the primary sleeve is different from a stroke associated with the secondary sleeve. In some embodiments, the secondary sleeve is coupled to a first link, and the first link is coupled to a crank, and the crank is coupled to a second link, and the second link is coupled to the blocker door. In some embodiments, the first link is configured to be oriented in a substantially axial direction relative to an axis of the thrust reverser when the thrust reverser is fully deployed. In some embodiments, the blocker door is configured to provide load from the blocker door through the second link and the crank to a fixed structure of the aircraft. In some embodiments, the thrust reverser further comprises a ring configured to couple to the blocker door. In some embodiments, the blocker door is configured to be stowed above a skin associated with at least one of the primary sleeve and a duct when the thrust reverser is stowed. In some embodiments, the primary sleeve and the secondary sleeve are configured to be driven via independent actuation mechanisms.

Aspects of the disclosure are directed to a thrust reverser of an aircraft comprising: a movable primary sleeve with an exterior surface exposed to the exterior free air stream around the thrust reverser during flight, the primary sleeve movable between a stowed position and a deployed position corresponding to reverse thrust operation, a movable secondary sleeve that includes a cascade for redirecting air from a fan duct during reverse thrust operation, the secondary sleeve movable between a stowed position and a deployed position corresponding to reverse thrust operation, and wherein the primary sleeve covers the cascade when the primary sleeve is in its stowed position, and the cascade is exposed to the exterior free air stream when the primary sleeve is in its deployed position. In some embodiments, the thrust reverser further comprises: a blocker door coupled to the secondary sleeve, the blocker door movable between a stowed position and a deployed position corresponding to reverse thrust operation, and wherein the blocker door is driven from its stowed position to its deployed position when the secondary sleeve moves from its stowed position to its deployed position. In some embodiments, the primary sleeve further comprises an interior skin and an exterior skin, the blocker door being fully positioned between the interior skin and the exterior skin when the blocker door is in its stowed position. In some embodiments, the thrust reverser further comprises: a first sliding mechanism coupled with the primary sleeve such that the primary sleeve is movable by sliding relating to a fixed structure of the thrust reverser along a sliding axis defined by the first sliding mechanism, and a second sliding mechanism coupled with the secondary sleeve such that the secondary sleeve is movable by sliding relating to a fixed structure of the thrust reverser along a sliding axis defined by the second sliding mechanism.

Aspects of the disclosure are directed to a thrust reverser of an aircraft comprising: a movable primary sleeve with an exterior surface exposed to the exterior free air stream around the thrust reverser during flight, the primary sleeve movable between a stowed position and a deployed position corresponding to reverse thrust operation, a movable secondary sleeve, the secondary sleeve movable between a stowed position and a deployed position corresponding to reverse thrust operation, a blocker door coupled to the secondary sleeve and movable between a stowed position and a deployed position corresponding to reverse thrust operation wherein the blocker door redirects air through a cascade, wherein when the secondary sleeve moved from its stowed position to its deployed position it drives the blocker door from its stowed position to its deployed position. In some embodiments, the cascade is mounted on and moves with the secondary sleeve. In some embodiments, at least a portion of the cascade radially overlaps a fan case of a turbofan engine, such as when the secondary sleeve is in a stowed position. In some embodiments, the blocker door is hidden from exposure to the air stream in a fan duct when the blocker door is in its stowed position.

Aspects of the disclosure are directed to a system for a thrust reverser of an aircraft comprising: fixed structure of the aircraft, and a blocker door pivotally supported by the fixed structure. In some embodiments, the system further comprises a primary sleeve, and a secondary sleeve coupled to the blocker door, wherein a stroke associated with the primary sleeve is different from a stroke associated with the secondary sleeve. In some embodiments, the primary sleeve and the secondary sleeve are configured to be driven via independent actuation mechanisms. In some embodiments, the system further comprises: a first link coupled to the secondary sleeve, a crank coupled to the first link, and a second link coupled to the crank, wherein the second link is coupled to the blocker door. In some embodiments, the first link is configured to be oriented in a substantially axial direction relative to an axis of the thrust reverser when the thrust reverser is fully deployed. In some embodiments, the blocker door is configured to provide load from the blocker door through the second link and the crank to the fixed structure. In some embodiments, the system further comprises a ring located aft of the fixed structure coupled to the blocker door.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
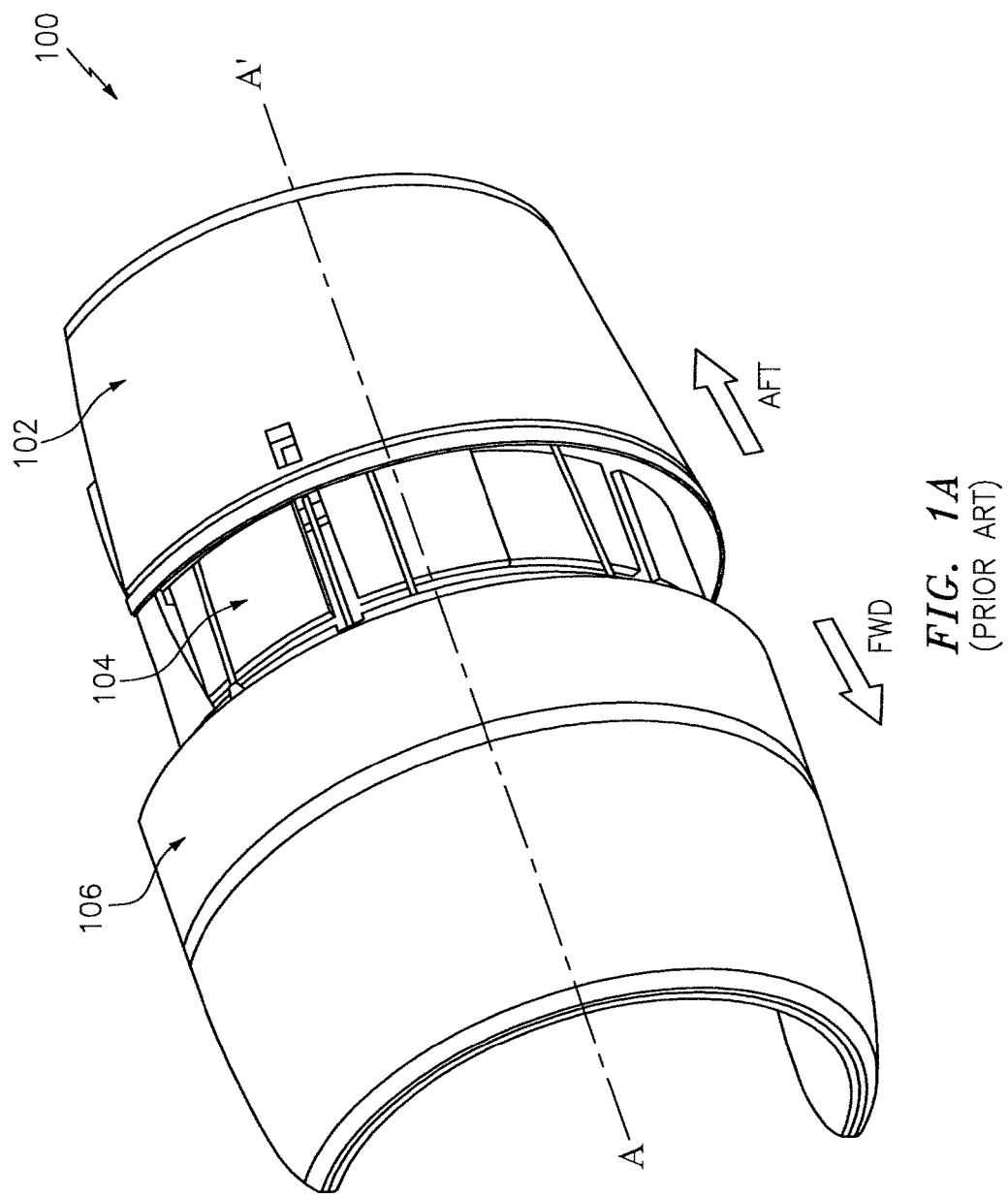
FIG. 1A schematically illustrates a thrust reverser system incorporating a translating sleeve in accordance with the prior art.
Figure 1B:
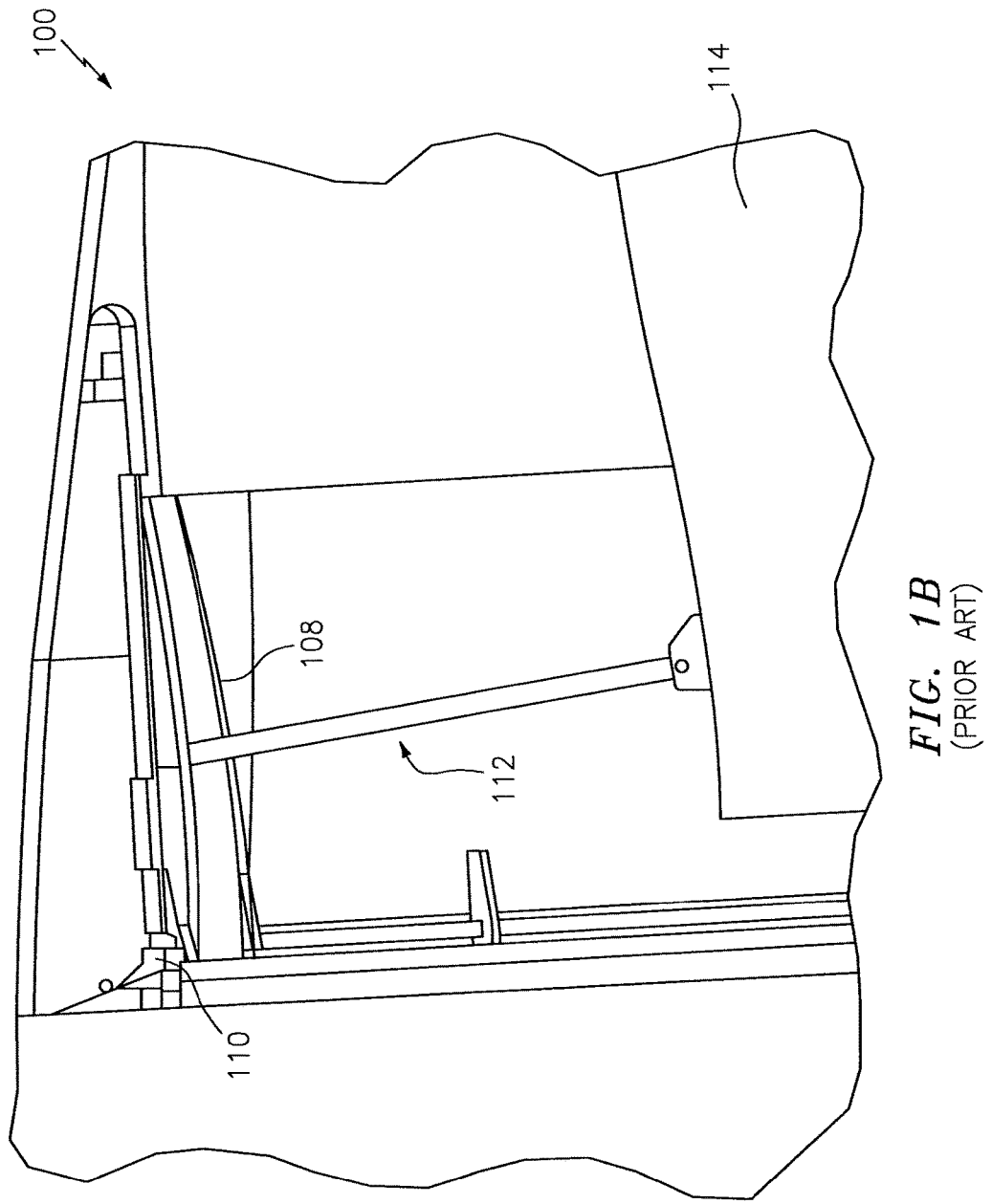
FIG. 1B schematically illustrates a drag link of the system of FIG. 1A in accordance with the prior art.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a translating cascade thrust reverser. In some embodiments, a translating cascade/secondary sleeve and a blocker door/primary sleeve can be operated via separate actuation or drive mechanisms, potentially in accordance with timing criteria (e.g., mechanically-based timing criteria).

Figure 2A:
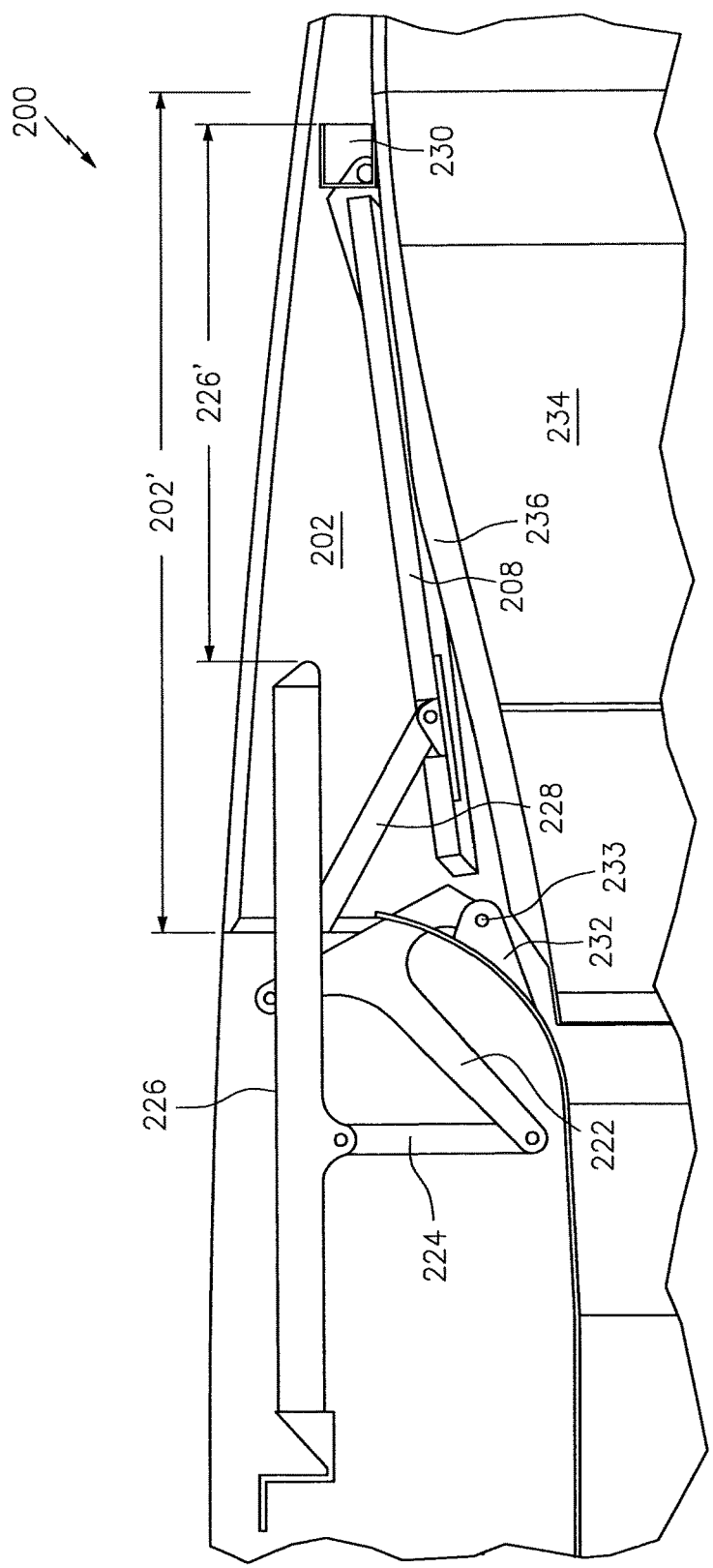
FIGS. 2A-2C schematically illustrate a thrust reverser system in accordance with aspects of the disclosure.
Figure 2B:
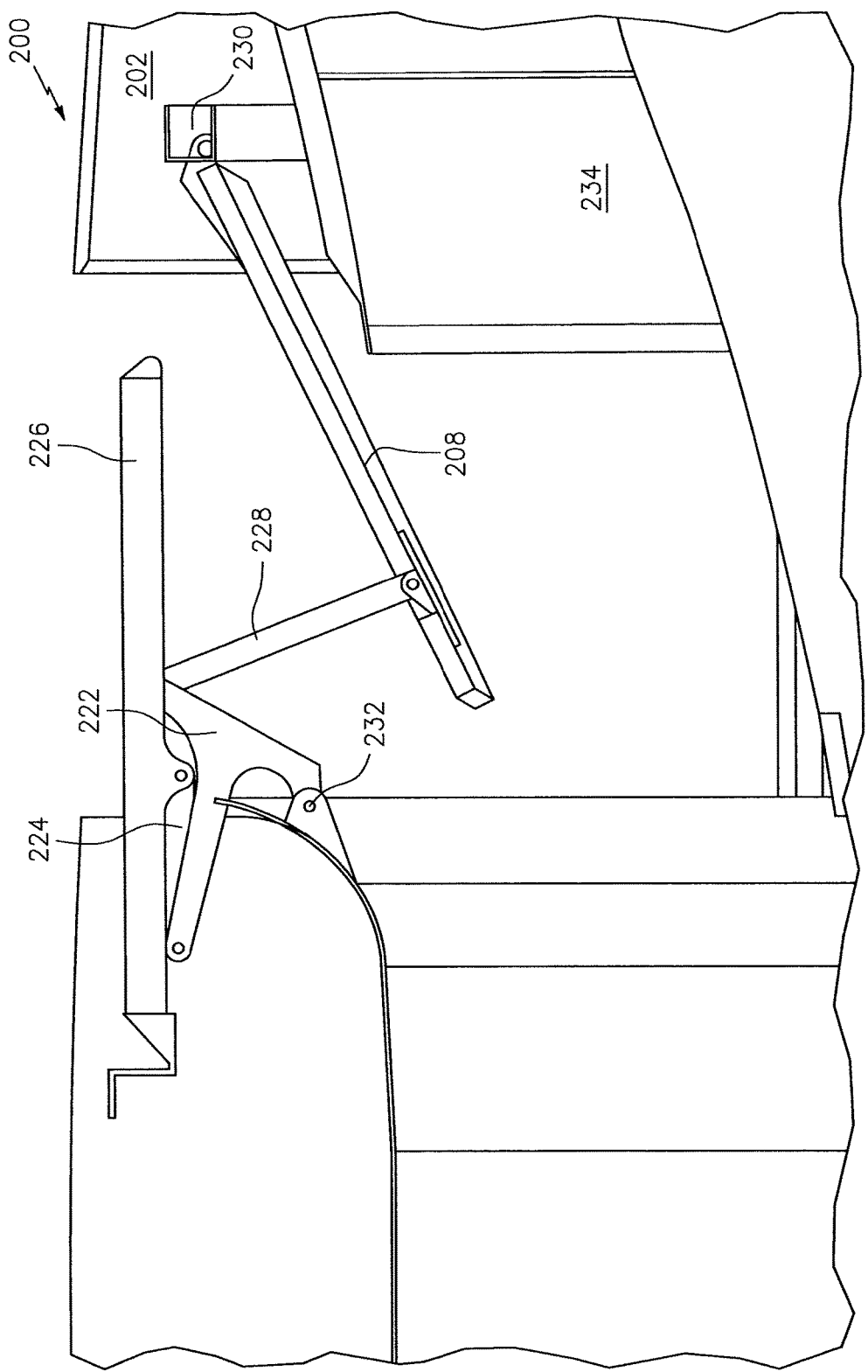
Figure 2C:
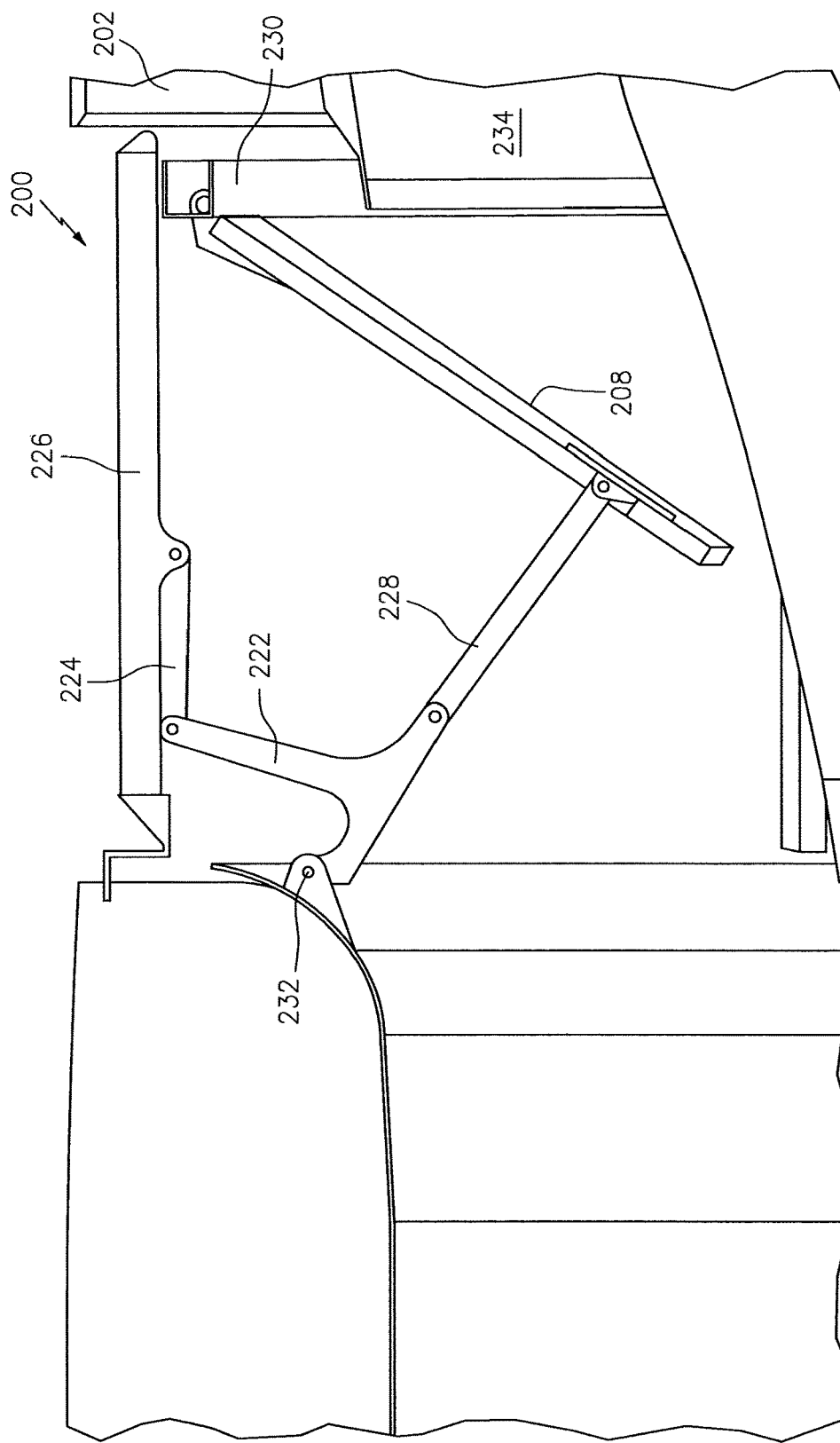
Figure 3:
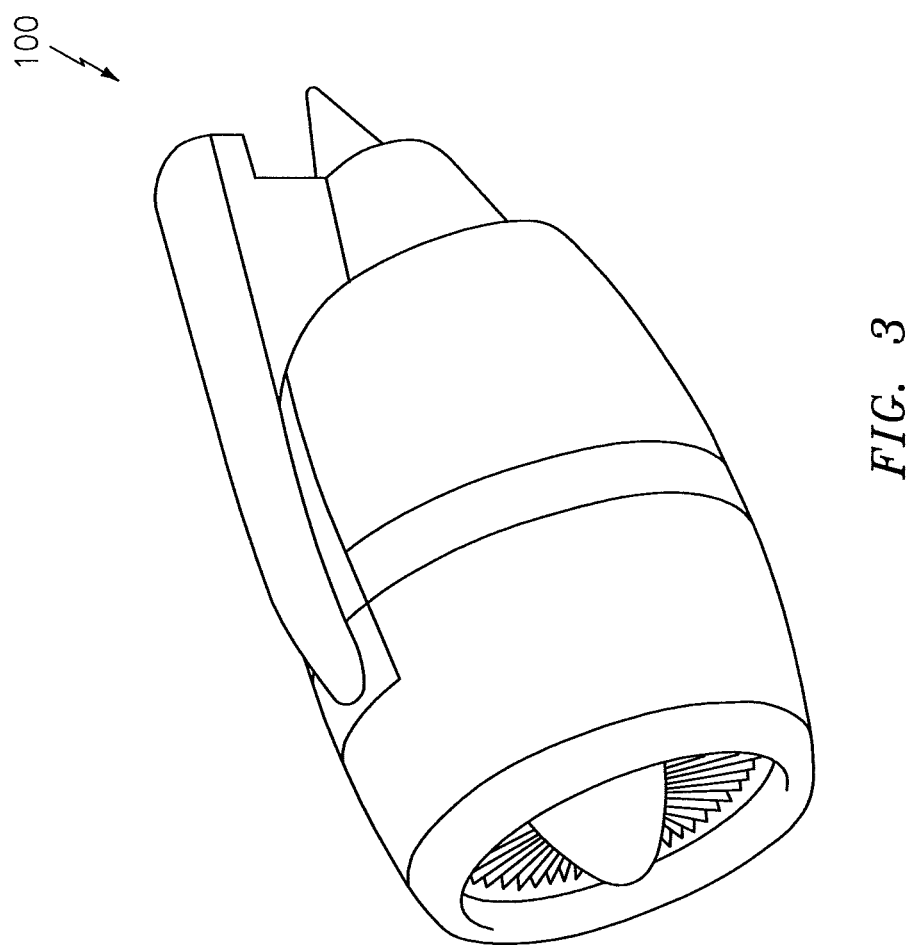
FIG. 3 illustrates a nacelle incorporating a thrust reverser.

Referring to FIGS. 2A-2C, a system 200 is shown. The system 200 includes a number of components/devices that are described further below. The views shown in FIGS. 2A-2C may represent a cross-section of a thrust reverser or nacelle, such as about the line A-A' of FIG. 1A.

The system 200 includes a crank 222, which may be referred to as (or correspond to) a main crank. The crank 222 is coupled to a driver link 224. The driver link 224 is coupled to a translating cascade 226, where the translating cascade 226 may be referred to as (or correspond to) a secondary sleeve. The translating cascade 226 may be coupled to one or more sliders (not shown) to support movement or translation of the translating cascade 226.

The crank 222 is coupled to a blocker link 228. The blocker link 228 is coupled to a blocker door 208. The blocker door 208 is coupled to a ring 230, which may be referred to as (or correspond to) an aft ring.

The blocker door 208 is similar to the blocker door 108 of the system 100. The blocker door 208 may be hidden in the sense that the majority or the entirety of its structure is not exposed to any fan bypass air flow in the fan duct during normal operation. By hiding the door 208, thrust reverser performance may be maximized/enhanced by allowing for a very smooth duct surface (free from or with significantly reduced steps and gaps) on skin 236, reducing the drag. In addition, because the blocker door geometry is no longer constrained or driven by the need to create an aerodynamically smooth surface when the door is stowed, the shape, geometry, or configuration of the door 208 may be selected to obtain improved or optimal thrust reverser performance.

The crank 222 is coupled to a structure 232 of the aircraft at a (pivot) point 233. The structure 232 may represent fixed structure of an aircraft and a direct load path into a torque box (not shown).

As shown in FIG. 2A, a sleeve 202 (which is similar to the sleeve 102 of the system 100) and a duct 234 are included as part of the system 200. The sleeve 202 may be referred to as a primary sleeve herein. The door 208 may reside above a skin 236 of the sleeve 202 and/or duct 234 when the thrust reverser is operated in the stowed state.

The system 200 may include a number of four-bar mechanisms. A first four-bar mechanism may include the crank 222, the driver link 224, the translating cascade 226, and the structure 232. A second four-bar mechanism may include the crank 222, the blocker link 228, the blocker door 208, and the structure 232.

Superimposed in FIG. 2A is an illustration of a first stroke 202' associated with the sleeve 202 relative to a second stroke 226' associated with the translating cascade 226. As used herein a stroke refers to the potential distance that a respective element may traverse. As shown in FIG. 2A, the first stroke 202' is different from the second stroke 226'.

In the progression from FIG. 2A to FIG. 2B and from FIG. 2B to FIG. 2C, the blocker door 208 transitions from a stowed state (FIG. 2A), to a state between stowed and deployed (e.g., 50% deployed) (FIG. 2B), to a deployed state (FIG. 2C). FIG. 2B may represent.

The greatest loads are generally experienced by the system 200 when the thrust reverser is fully deployed (e.g., FIG. 2C). In FIG. 2C, the driver link 224 is oriented in a substantially axial direction relative to an axis or center-line of the thrust reverser. Accordingly, any bending in the translating cascade 226 is minimized/reduced because the load introduced by the driver link 224 to the cascade 226 is in line with the cascade axial direction and only slightly offset. In addition, load from the blocker door 208 is provided through the blocker link 228 and the crank 222 to the structure 232, which is a structurally efficient load path and also minimizes bending because the blocker link 228 is in line and parallel with the load path through the crank 222.

As shown in FIGS. 2A-2C, the door 208 is pivotally supported with respect to the fixed structure (e.g., structure 230 and 232), as opposed to being pivotally supported by the sleeve 202.

Figure 4A:
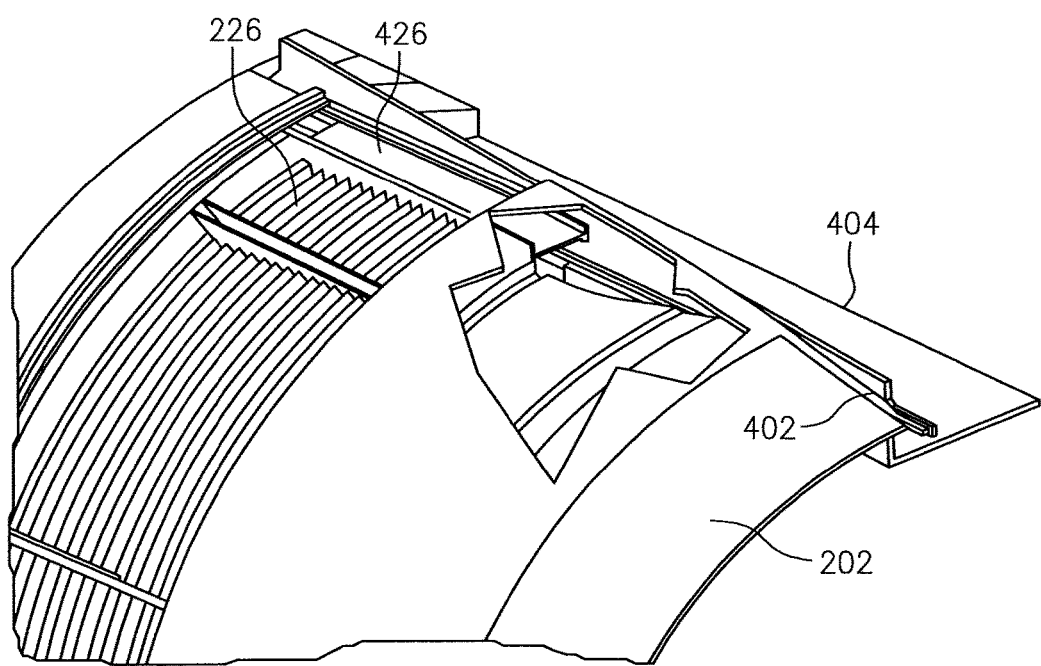
FIGS. 4A-4B illustrate the thrust reverser of FIGS. 2A-2C in a deployed condition.
Figure 4B:
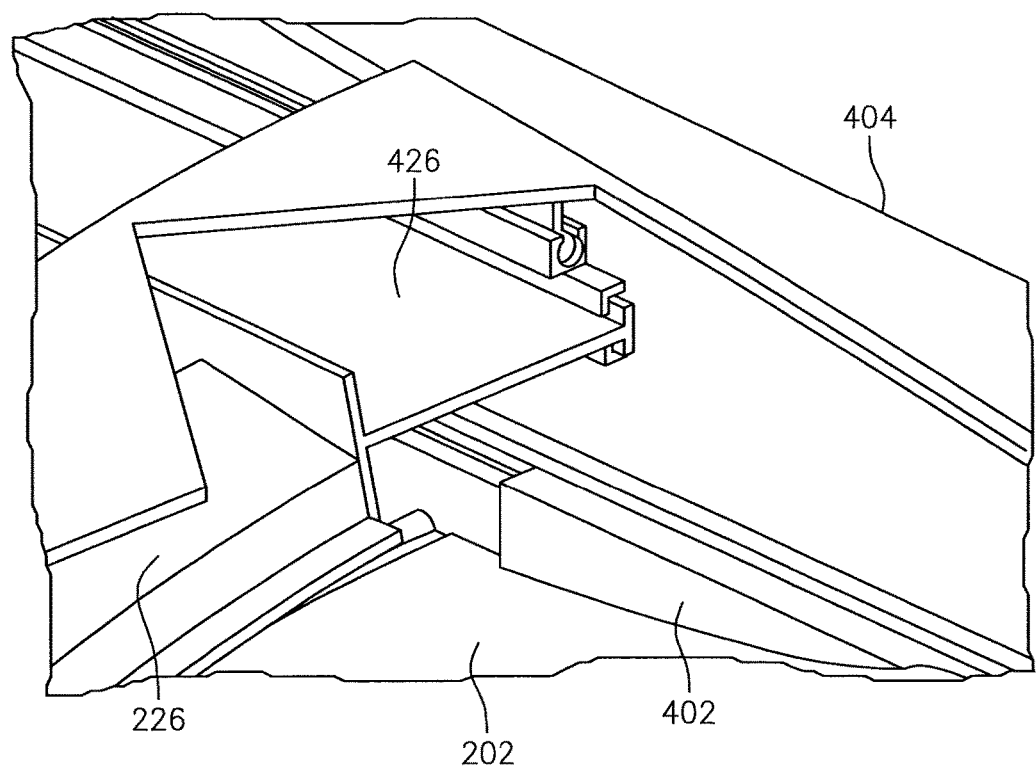

FIGS. 4A and 4B illustrate the thrust reverser from FIGS. 2A through 2C in the deployed condition, and include a view of the sliding mechanisms for the sleeve 202 and the translating cascade/secondary sleeve 226. Because they move at different rates, times and have different strokes, the sliding mechanisms for each are separate. A sliding mechanism 402 serves the sleeve 202. Sliding mechanism 402 includes a portion that is mounted to sleeve 202 and a portion that is mounted to a hinge beam 404, and the two portions are configured to slide relative to one another. Likewise, sliding mechanism 426 serves the secondary sleeve 226, and includes a portion that is mounted to secondary sleeve 226 and a portion that is mounted to the hinge beam 404, and the two portions are configured to slide relative to one another. This allows the primary sleeve 202 and the secondary sleeve 226 to move independently of one another. Those of ordinary skill in this art will also recognize that similar sliding mechanisms may be included at the six o'clock position of the primary sleeve 202 and the secondary sleeve 226 in some embodiments.

Figure 5A:
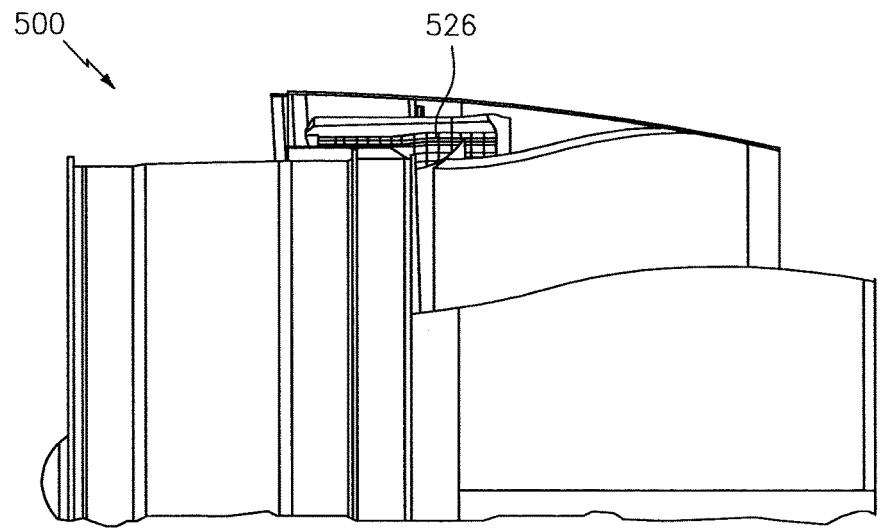
FIGS. 5A-5B illustrate a thrust reverser in accordance with aspects of the disclosure.
Figure 5B:
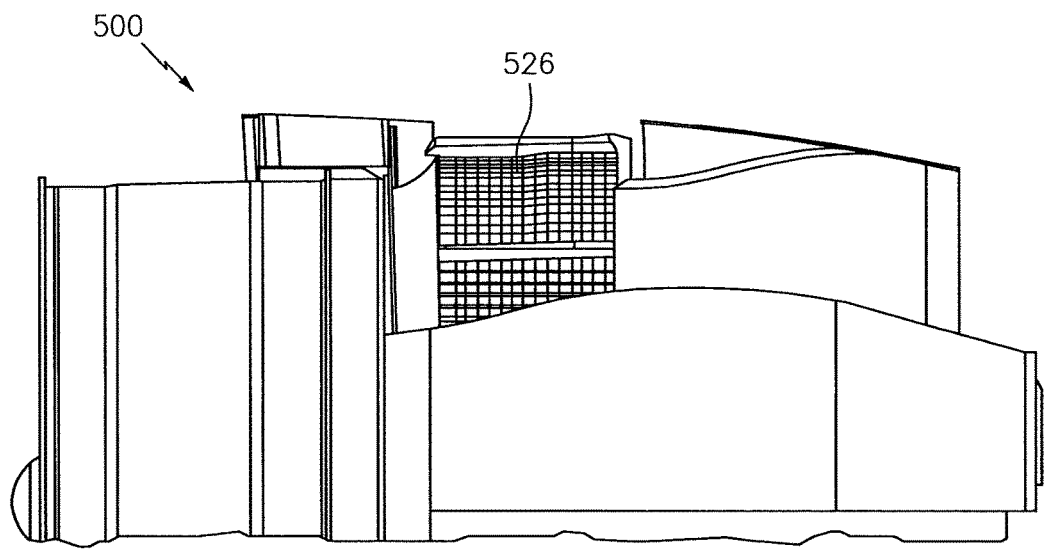

FIGS. 5A-5B schematically illustrate cross-sectional views of a cascade and propulsion system 500 similar to the arrangements described above in connection with FIGS. 2A-2C and 4A-4C. In particular, FIGS. 5A-5B illustrate that when a thrust reverser is in a stowed condition/state cascades 526 partially or completely overlap (in the radial direction of the system 500) the fan case, and in the deployed condition/state there is no overlap, the forward edge of the cascade assembly 526 is about in-line with the trailing edge of the fan case, and the cascades 526 are exposed.

The primary sleeve 202 and the secondary sleeve 226 may be actuated in conventional and known manners, as will be recognized by those of ordinary skill in this art. A pneumatic, hydraulic or lead screw actuator may be positioned between each sleeve and any fixed structure of the thrust reverser in order to control the deployment of each sleeve. It may also be possible to use a single actuator to deploy both sleeves, with special arrangements made so that the sleeves can begin their deployment at different times and deploy at different rates and with different strokes.

While some of the examples were described above in connection with a translating cascade reverser, one skilled in the art would appreciate that aspects of the disclosure may be applied in connection with any type of reverser, such as a secondary sleeve reverser and/or conventional reversers including those with fixed nozzles/trailing edges. Further, the mechanism can be tailored for transient and deployed area match as may be required for a particular application.

Technical effects and benefits of the disclosure include obtaining a maximum/increased efficiency in terms of engine operation/output by minimizing/reducing drag losses. Additionally, the size/profile of one or more components/devices may be minimized/reduced, allowing for shorter lines of travel and better/different packaging options. Configuring the cascade so that it overlies the fan case when stowed should allow for the thrust reverser to be shorter than would otherwise be the case. Separating a translating cascade/secondary sleeve stroke from a primary sleeve stroke facilitates the design feature of positioning the cascade over the fan case in its stowed position.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A thrust reverser of an aircraft comprising:
a moveable primary sleeve; and
a moveable secondary sleeve coupled to a blocker door independent of the primary sleeve, wherein the secondary sleeve drives the blocker door from a blocker door stowed position to a blocker door deployed position; and
wherein a stroke associated with the primary sleeve is longer than a stroke associated with the secondary sleeve.

2. The thrust reverser of claim 1, wherein the moveable secondary sleeve is coupled to a first link, and wherein the first link is coupled to a crank, and wherein the crank is coupled to a second link, and wherein the second link is coupled to the blocker door.

3. The thrust reverser of claim 2, wherein the first link is configured to be oriented in a substantially axial direction relative to an axis of the thrust reverser when the thrust reverser is fully deployed.

4. The thrust reverser of claim 2, wherein the blocker door is configured to provide load from the blocker door through the second link and the crank to a fixed structure of the aircraft.

5. The thrust reverser of claim 1, further comprising:
a ring configured to couple to the blocker door.

6. The thrust reverser of claim 1, wherein the blocker door is configured to be stowed above a skin associated with at least one of the primary sleeve and a duct when the thrust reverser is stowed.

7. The thrust reverser of claim 1, further comprising:
a fixed structure configured to be within a compartment of the primary sleeve when the primary sleeve is in a stowed position;
wherein the blocker door is pivotally mounted to the fixed structure.

8. The thrust reverser of claim 1, further comprising:
a structure configured to be within a compartment of the primary sleeve when the primary sleeve is in a stowed position;
wherein the primary sleeve moves relative to the structure when the primary sleeve moves between the stowed position and a deployed position; and
wherein the blocker door is pivotally mounted to the structure.

9. The thrust reverser of claim 3, wherein
the blocker door is configured to provide load from the blocker door through the second link and the crank to a fixed structure of the aircraft;
the primary sleeve comprises an exterior surface exposed to an exterior free air stream around the thrust reverser during flight, and the primary sleeve is movable between a primary sleeve stowed position and a primary sleeve deployed position corresponding to the reverse thrust operation;
the secondary sleeve comprises a cascade for redirecting air from a fan duct during the reverse thrust operation, and the secondary sleeve is movable between a secondary sleeve stowed position and a secondary sleeve deployed position corresponding to the reverse thrust operation; and the primary sleeve covers the cascade when the primary sleeve is in the primary sleeve stowed position, and the cascade is exposed to the exterior free air stream when the primary sleeve is in the primary sleeve deployed position.

10. The thrust reverser of claim 1, wherein the stroke associated with the primary sleeve is indicative of a distance traveled by the primary sleeve between a stowed positioned of the primary sleeve and a fully deployed position of the primary sleeve; and the stroke associated with the secondary sleeve is indicative of a distance traveled by the secondary sleeve between a stowed positioned of the secondary sleeve and a fully deployed position of the secondary sleeve.

11. A thrust reverser of an aircraft comprising:

a movable primary sleeve with an exterior surface exposed to an exterior free air stream around the thrust reverser during flight, the primary sleeve movable a first distance between a primary sleeve stowed position and a primary sleeve deployed position corresponding to reverse thrust operation;

a movable secondary sleeve that includes a cascade for redirecting air from a fan duct during the reverse thrust operation, the secondary sleeve movable a second distance between a secondary sleeve stowed position and a secondary sleeve deployed position corresponding to the reverse thrust operation; and a blocker door coupled to the secondary sleeve, wherein the secondary sleeve is coupled to the blocker door independent of the primary sleeve;

wherein the primary sleeve covers the cascade when the primary sleeve is in the primary sleeve stowed position, and the cascade is completely exposed to the exterior free air stream when the primary sleeve is in the primary sleeve deployed position; and wherein the first distance is different from the second distance; and wherein the secondary sleeve drives the blocker door from a blocker door stowed position to a blocker door deployed position.

12. A thrust reverser according to claim 11, wherein the blocker door movable between the blocker door stowed position and the blocker door deployed position corresponding to the reverse thrust operation; and wherein the blocker door is driven from its stowed position to the blocker door deployed position when the secondary sleeve moves from the secondary sleeve stowed position to the secondary sleeve deployed position.

13. A thrust reverser according to claim 12:

wherein the primary sleeve further comprises an interior skin and an exterior skin, the blocker door is fully positioned between the interior skin and the exterior skin when the blocker door is in the blocker door stowed position.

14. A thrust reverser according to claim 11, further comprising:

a first sliding mechanism coupled with the primary sleeve such that the primary sleeve is movable by sliding relating to a fixed structure of the thrust reverser along a sliding axis defined by the first sliding mechanism; and a second sliding mechanism coupled with the secondary sleeve such that the secondary sleeve is movable by sliding relating to the fixed structure of the thrust reverser along a sliding axis defined by the second sliding mechanism.

15. A thrust reverser of an aircraft comprising:

a movable primary sleeve with an exterior surface exposed to an exterior free air stream around the thrust reverser during flight, the primary sleeve movable between a primary sleeve stowed position and a primary sleeve deployed position corresponding to reverse thrust operation;

a movable secondary sleeve, the secondary sleeve movable between a secondary sleeve stowed position and a secondary sleeve deployed position corresponding to the reverse thrust operation;

a blocker door coupled to the secondary sleeve independent of the primary sleeve and movable between a blocker door stowed position and a blocker door deployed position corresponding to the reverse thrust operation wherein the blocker door redirects air through a cascade;

wherein, when the secondary sleeve moves from the secondary sleeve stowed position to the secondary sleeve deployed position, the secondary sleeve drives the blocker door from the blocker door stowed position to the blocker door deployed position; and wherein the movable primary sleeve moves relative to the movable secondary sleeve.

16. A thrust reverser according to claim 15 wherein the secondary sleeve comprises the cascade.

17. A thrust reverser according to claim 16 wherein, in the secondary sleeve stowed position, at least a portion of the cascade radially overlaps a fan case of a turbofan engine.

18. A thrust reverser according to claim 17 wherein the blocker door is hidden from exposure to the exterior free air stream in a fan duct when the blocker door is in the blocker door stowed position.

* * * * *